No. 798,972. PATENTED SEPT. 5, 1905.
T. OTT.
GLASS DECORATION.
APPLICATION FILED DEC. 1, 1903.

WITNESSES
INVENTOR
Theodore Ott
BY
ATTORNEYS

UNITED STATES PATENT OFFICE.

THEODORE OTT, OF STRASSBURG, GERMANY.

GLASS DECORATION.

No. 798,972. Specification of Letters Patent. Patented Sept. 5, 1905.

Application filed December 1, 1903. Serial No. 183,398.

*To all whom it may concern:*

Be it known that I, THEODORE OTT, a subject of the Emperor of Germany, residing at Strassburg, Alsace-Lorraine, Germany, have made certain new and useful Improvements in Glass Decorations, of which the following is a specification.

My invention relates to a special decoration, consisting in various kinds of glass variously colored with metallic insertions, adapted for sign-boards, wall-decorations, and the like. The metallic insertion is protected by means of an insulating-layer of wax, asphalt, tar, oil-fat, or the like to protect and preserve the metal. A mass of suitable cementing material—such as gypsum, cement, putty, or the like—holds the pieces of glass firmly together and forms at the same time a support. Separate parts of the ornamental surface—such as lace-patterns, framings, ornaments, or the like—may project above the level of the decorative surface, or both above or beneath it, so that by means of the various parts of the glass angles are formed, which will produce multiple reflections and at the same time increase the effects of light and shade.

Figure 1:
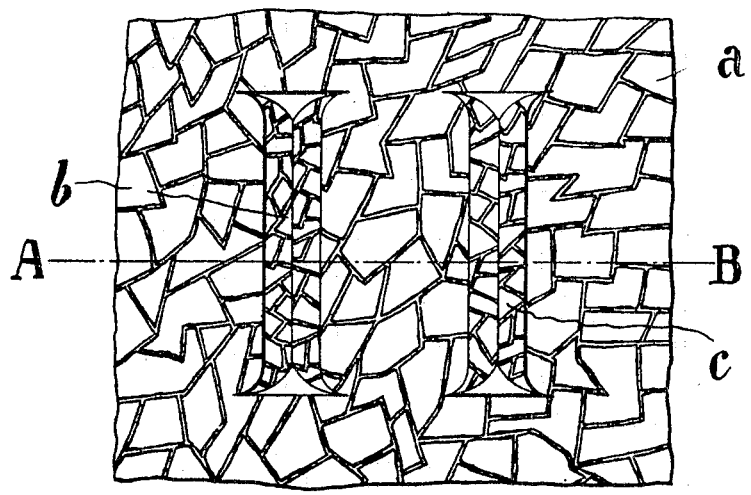
Figure 2:
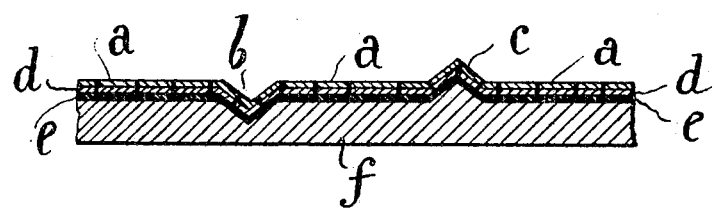

Figure 1 shows a front elevation of a decoration having parts projecting above the decorated plane. Fig. 2 shows a section on the line A B of Fig. 1.

The glass decoration consists in a number of variously shaped and colored glasses $a$ arranged together, which are cut into the required shapes and are put together in the required pattern and on the same plane, either throughout or else over a portion of the surface, with parts $c\ b$ projecting above the surface $a$ or sunk beneath it and arranged at different angles to one another or terminating in curves. The glasses $a$ and the projecting or recessed parts $c\ b$ are provided with metallic insertion $d$. This is protected by an insulating-layer $e$, and the whole is held together by a mass of suitable cementing material $f$. The projected glasses of the recess $b$ and projection $c$ reflect the light-rays on both sides before the same reach the eye of the beholder.

Having now particularly described my invention, I declare that what I claim is—

An improved glass decoration, comprising the glass surface, a metal insertion beneath the same, and projections and recesses formed in said glass surface extending above and below the plane thereof, so that the light-rays are repeatedly reflected before they reach the eye of the beholder, substantially as described.

In witness whereof I have hereunto set my hand in presence of two witnesses.

THEODORE OTT.

Witnesses:
 SIEGFRIED HAUSER,
 GUSTAV SCHWEIN.